Oct. 3, 1950 — F. T. ROBERTS — 2,524,680
METHOD AND APPARATUS FOR COVERING BALLS
Filed April 13, 1946 — 7 Sheets-Sheet 1

FIG-1

INVENTOR
FRED T. ROBERTS
By Bates, Teare, v McKean
ATTORNEYS Oct. 3, 1950     F. T. ROBERTS     2,524,680
METHOD AND APPARATUS FOR COVERING BALLS
Filed April 13, 1946     7 Sheets-Sheet 2

INVENTOR
FRED T ROBERTS
By Bates, Teare & McDean
ATTORNEYS

Oct. 3, 1950     F. T. ROBERTS     2,524,680
METHOD AND APPARATUS FOR COVERING BALLS
Filed April 13, 1946     7 Sheets-Sheet 3

INVENTOR
FRED. T. ROBERTS
BY Bates, Teare, & McBean
ATTORNEYS

Oct. 3, 1950  F. T. ROBERTS  2,524,680
METHOD AND APPARATUS FOR COVERING BALLS
Filed April 13, 1946  7 Sheets-Sheet 4

INVENTOR
FRED T. ROBERTS
BY Bates, Teare, & McBean
ATTORNEYS

Oct. 3, 1950         F. T. ROBERTS         2,524,680
METHOD AND APPARATUS FOR COVERING BALLS Filed April 13, 1946                      7 Sheets-Sheet 6

INVENTOR
FRED T. ROBERTS
BY Bates, Teare, McKee
ATTORNEYS

Oct. 3, 1950     F. T. ROBERTS     2,524,680
METHOD AND APPARATUS FOR COVERING BALLS
Filed April 13, 1946     7 Sheets-Sheet 7

INVENTOR
FRED T. ROBERTS
By Bates, Teare, M<sup>c</sup>Leod
ATTORNEYS

Patented Oct. 3, 1950

2,524,680

UNITED STATES PATENT OFFICE 2,524,680

METHOD AND APPARATUS FOR COVERING BALLS

Fred Thomas Roberts, Ridgefield, Conn.

Application April 13, 1946, Serial No. 661,989

30 Claims. (Cl. 154—16)

The present invention relates to a method and apparatus for covering tennis balls and the like and is an improvement on that shown in my prior application for Letters Patent filed May 3, 1945, and assigned Serial No. 591,787, now Patent No. 2,505,430.

As in my prior application, the general object of the invention is to reduce the manual operation required to cover a tennis ball or the like. Further it is an object of the present invention to provide a method of covering a ball in which the pressure within the ball is used most effectively to expand it into contact with the cover against the wall of the mold cavity.

Another object of the present invention is to provide an apparatus into which preformed tennis balls and the like, having cover members merely "tacked" thereon, may be positioned to have the covers permanently affixed thereto without further manual operation.

Heretofore it has been the general practice in the manufacture of tennis balls or the like to form first an inflated rubber ball of a correct size for covering, apply a coating of cement to the ball, and then apply a pair of figure eight shaped cover members to the ball entirely by hand operations. These cover members were cut to the required shape from a sheet of melton, one face of which previously had been coated with cement. The covers were then affixed to the ball entirely by hand. Great skill was required to apply the covers to the ball without wrinkling or otherwise distorting the covers. The ball with its cover was then vulcanized to set the cement. This vulcanization caused a shrinkage of the cover requiring a fullness of the cover pieces when applied, which added to the difficulties encountered and the skill required in properly applying the covers to the ball. Moreover great skill was required to prevent the formation of air bubbles beneath the cover.

In my prior application, I disclosed a method of covering tennis balls and the like where one face of the melton covering members was coated with an air-curable cement, the cement closing the pores on that side of the melton and becoming substantially dry in place. Such cement, however, is still able to effect a ready adherence of the cover to a ball covered with a cement of a different character. These cover members, cut in the usual figure eight fashion, were then "tacked" in place on a previously formed ball having cement applied thereto. The "tacking" in place was accomplished by bringing two narrow zones, which extended centrally lengthwise of the respective cover members, into contact with equatorial regions of the ball, leaving the remainder of the cover member out of contact with the surface of the ball. Thereupon the ball was placed in a rubber-lined mold cavity formed by a pair of coacting mold members, the air exhausted from between the lining and the mold cavities and from between the lining and the ball. This exhaustion of air from the mold causes the ball with its cover to expand into contact with the mold surface by reason of the internal pressure of the ball, thereby causing the cover to adhere to the ball. The mold cavity was formed as a perfect sphere, thus avoiding all wrinkling of the cover. Thereafter, if desired, fluid pressure was applied between the lining and the mold cavity to return or squeeze the ball to its original size, thereby additionally insuring the fixation of the cover to the ball.

The present invention contemplates the fixing of the "tacked" cover to the rubber ball not only by expanding the ball due to exhaustion of the air from between the mold cavity and the ball, but in addition thereto increasing this pressure by mechanically distorting the ball.

The present invention further provides an improved mold construction for fixing the cover to the ball, as well as the provision of an apparatus capable of use either with the mold members disclosed in my prior application, heretofore mentioned, or with improved mold members of the present invention, and which apparatus will be substantially automatic in operation and capable of efficiently and rapidly fixing the cover to the ball, in an economical manner without requiring the attention of skilled operators or without requiring the vulcanization by application of heat to the finished product.

Other objects, features and advantages of the invention will be brought out more in detail in the following description, reference being had to the accompanying drawings. The essential features of the invention will be summarized in the claims.

Figures 6, 7, 8, 9:
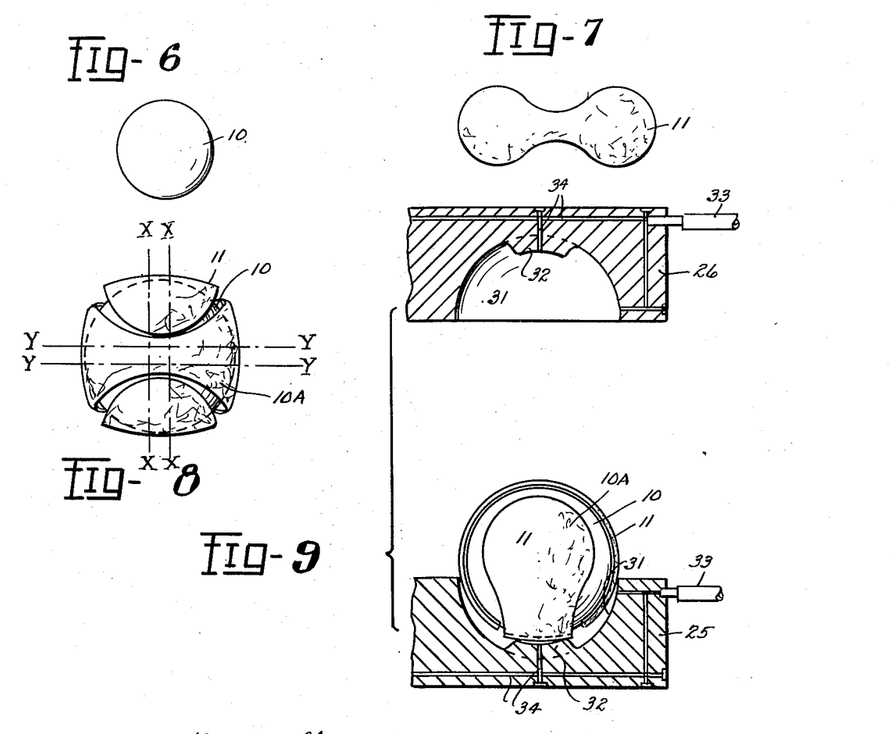
Fig. 6 is a view of a ball to be covered.
Fig. 7 is a more or less diagrammatic illustration of one cover member.
Fig. 8 is a view of the ball of Fig. 6 having two cover members tacked thereon and which are to be firmly fixed in place by the method and apparatus of this invention.
Fig. 9 is a fragmentary sectional view, the plane of the section being indicated by the line 9—9 on Fig. 1, and illustrating a portion of an improved mold member.

One of the two eight-shaped cover members to be applied by my improved process and apparatus is shown at 11 in Fig. 7. The cover members are usually died out of a layer of melton and a cement applied to one face thereof. These covers are then applied or "tacked" in place on a previously formed inflated rubber ball 10, either manually or by mechanism such as shown in my prior application for Letters Patent, Serial No. 591,787, filed May 3, 1945.

The initial application or "tacking" of the cover members 11 to the ball 10 is accomplished by placing two of the cover members about the ball, which has been previously covered with cement, the cover members being positioned with their longitudinal axes at right angles to each other and then applied to the ball by pressing the cover members onto the ball only along two narrow equatorial zones indicated at XX and YY on Fig. 8. Care is taken that the cover members outside of these zones are substantially free from contact with the ball.

The ball 10 is the usual hollow rubber type which is inflated by an internal fluid pressure to the degree desired in the finished ball, for instance, forty-two pounds to the square inch for a tennis ball. This inflation may have been effected by closing the ball in an atmosphere of compressed air, or by closing it with suitable chemicals in the interior which react to produce pressure, or by puncturing the completed ball with a hollow needle, injecting a compressed fluid, and thereafter sealing the opening. All of these practices are well known and are common in the art.

Figure 1:
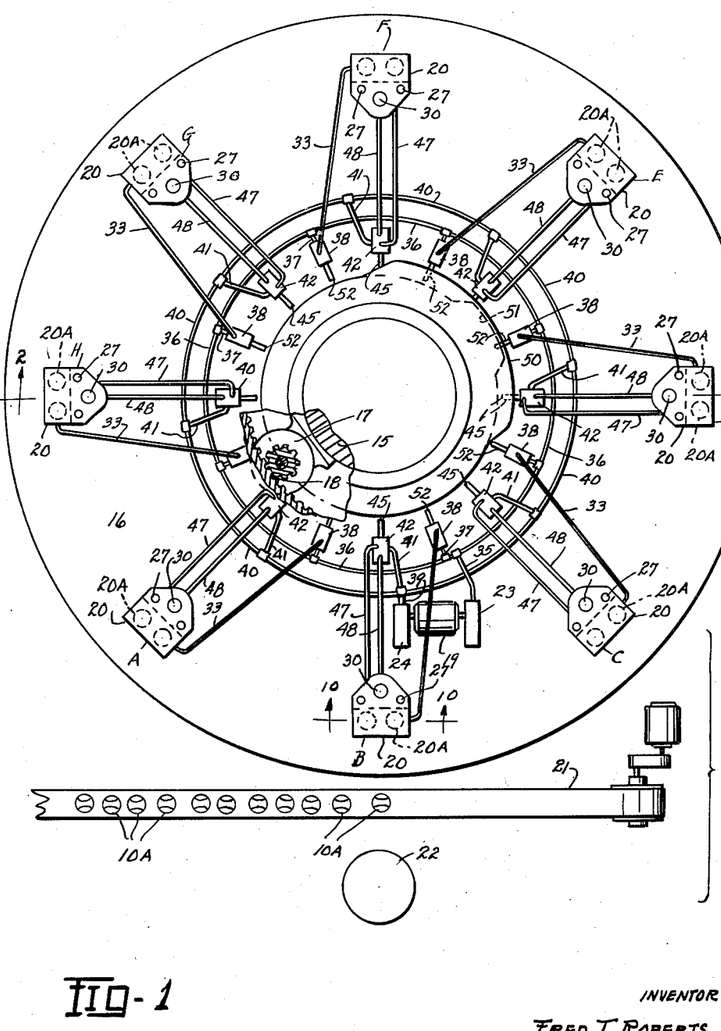
Fig. 1 is a plan, partly broken away, of an apparatus according to this invention and adapted to be used in the performance of the improved method.
Figure 2:
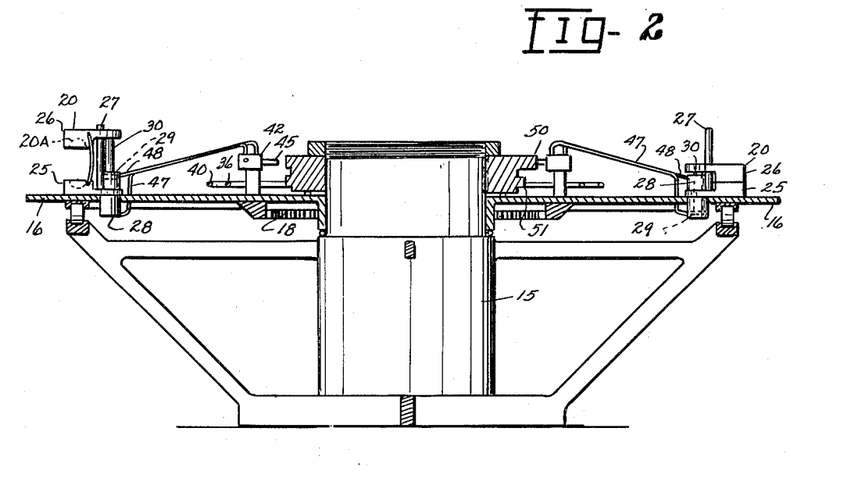
Fig. 2 is a vertical section through the apparatus on a plane indicated by the line 2—2 on Fig. 1.

After the covers have been initially applied to and "tacked" in place on the ball as indicated in Fig. 8, the ball is placed in an apparatus which firmly affixes the cover to the ball. Such an apparatus is illustrated in Figs. 1 and 2. As there shown, the apparatus may comprise a main frame or base 15 upon which a table 16 is rotatably mounted. The table is rotated about the axis of the base by a motor 17 carried by the base and having a geared connection 18, with the table.

The table 16 is provided with a plurality of sets of molds 20. As shown in Fig. 1, these molds are equally spaced adjacent the periphery of the table, eight sets of molds being shown. Each mold is provided with one or more cavities 20A for the reception of the preliminarily covered balls 10A of Fig. 8. The balls may be fed to the apparatus by a conveyor, indicated in Fig. 1 at 21, and manually removed therefrom and placed in the mold cavities 20A by an operator from a position generally indicated in Fig. 1 at 22.

Each set of molds 20 may comprise a lower mold member 25 which, as indicated in Fig. 2, is fixed to the rotary table 16, and an upper mold member 26 movably vertically toward and away from the lower mold member on suitable guides, such as posts 27.

The mold members are opened and closed by a hydraulic mechanism which may comprise a cylinder 28 (Fig. 2) carried by the table 16, and a piston 29 carried by a piston rod 30 which is secured to the upper mold member in the usual manner. Thus, when fluid pressure is applied to the cylinder beneath the piston, the mold members will be separated, and when fluid is applied above the piston, the mold members will be brought together.

Figure 10:
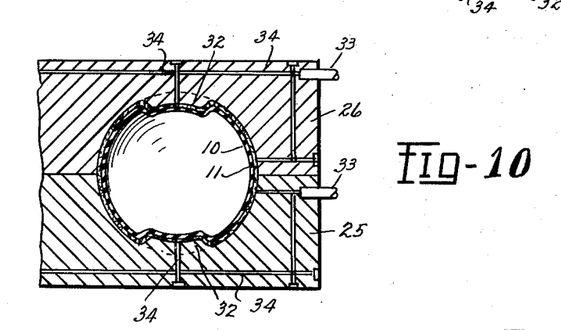
Fig. 10 is a section similar to Fig. 9 but illustrating the parts in a different operating position.

The mold members 25 and 26 are each provided with at least one semi-spherical cavity 31. The ball 10A is positioned manually in the cavity 31 of the lower mold 25, as indicated in Fig. 9, at a time when the molds are separated. After the ball 10A has been positioned within the mold member 25, the molds are brought together, as indicated in Fig. 10, and the air between the wall of the mold cavities and the ball is exhausted. The internal pressure within the ball then acts to expand the ball into contact with the walls of the mold cavity without any air between the cover and the ball.

The ball is further forced into contact with the mold cavities by distorting the ball to increase the internal pressure thereof. As shown in Figs. 9 and 10, each mold cavity 31 is provided with a centrally located inwardly projecting hump or boss 32, which, when the molds are brought together as shown in Fig. 2, forces the wall of the ball inwardly, thereby causing the ball to expand in other regions into contact with the walls of the cavity. This mechanical distortion of the ball increases the effective internal pressure against the mold. It also permits the use of a larger mold cavity than is possible where the internal pressure provided by the gas within the ball is the sole expanding force, and accordingly less accuracy is required in proportioning the size of the cavities to the balls.

The air between the mold cavities 31 and the ball is withdrawn by a vacuum pump, generally indicated at 23 in Fig. 1, and which is connected, as will be hereinafter described, with a flexible conduit 33 communicating with passageways 34 (Fig. 9) in the mold members 25 and 26. These passageways extend through the mold members and communicate with the mold cavities in the region of the bosses or humps 32.

It will be noted in Figs. 9 and 10 that each boss or hump 32 lies in substantially the exact center of the wall of its respective mold cavity, and that the ball is placed in the lower mold with one figure eight cover member 11 centered on the lower mold boss 32 so that the greater portion of the seams on the ball extend substantially vertically, which is the direction of the closing movement of the mold, and the mid-point of each cover is held in position against the ball as the pressure is exerted by the bringing of the mold members together.

The application of fluid pressure to the cylinder 28, as well as the exhaustion of the air from the mold, is automatically controlled by the rotation of the table 16 about the axis of the base 15. As shown in Fig. 1, the vacuum pump 23 together with a fluid pressure pump 24 are mounted on the table 16 and are driven by a motor 19. Power may be supplied to the motor in any suitable manner, such as for instance through the usual collector rings, not shown.

The vacuum pump 23 is connected by a conduit 35 with a manifold 36 which is connected by conduits 37 with a series of valves 38. As illustrated, there is a valve 38 for each mold unit 20. These valves 38, like the mold units 20, are spaced equal distance from each other about the table 16 and each valve is connected with its respective mold unit 20 by the conduit 33 heretofore mentioned. Similarly, the fluid pressure pump 24 is connected by conduits 39, 40 and 41, with respective fluid pressure valves 42 (Figs. 1 and 2), there being one such valve for each mold unit. Each of these valves 42 is connected with the cylinder 28 of its respective mold unit 20 by a pair of conduits 47 and 48.

Figures 3, 4, 5:
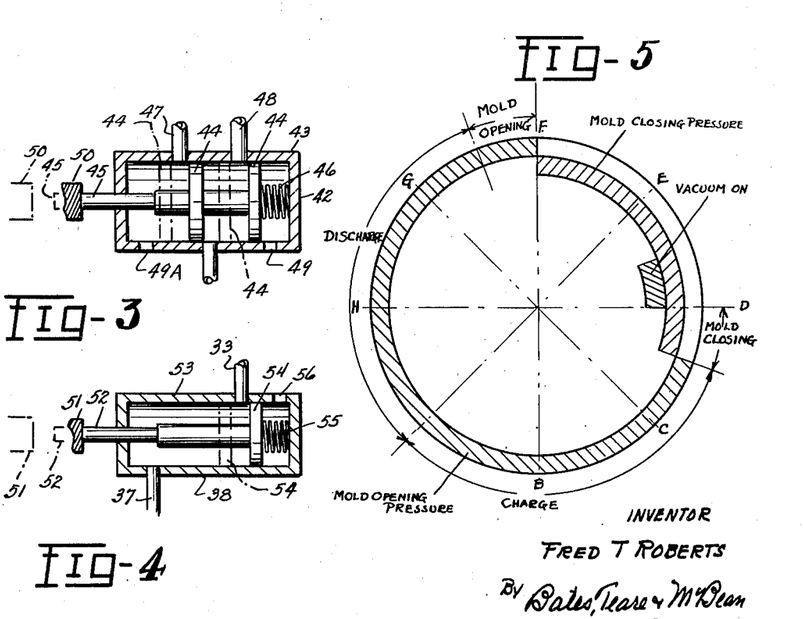
Figs. 3 and 4 are diagrams illustrating pressure and vacuum valve mechanisms respectively.
Fig. 5 is a diagram of one complete cycle of operation of the mechanism.

A fluid pressure valve of the type which may be used to control the opening and closing of the mold members is diagrammatically illustrated in Fig. 3. As there shown, the valve 42 may comprise a housing 43 in which is mounted a pair of spaced valve members such as the pistons 44 which are connected together by a plunger 45 extending outwardly through one end of the valve housing 43 and serving as an operating member therefor. A spring, such as that shown at 46, normally acts to retain the pistons 44 in the dotted line position shown in Fig. 3, in which position fluid pressure from the pump 24 passes through the conduit 41 and through the valve 42 and the conduit 47 to the lower end of the mold cylinder 28, while the upper end of the cylinder 28 exhausts through the conduit 48 through the valve 42 and an exhaust port 49 in the valve housing. Thus the mold members are normally maintained in a separated position.

To close the mold members the pressure on opposite sides of the piston is reversed. This is caused by the valve rod 45 striking a stationary cam 50 (Figs. 1, 2 and 3), causing the valve members 44 to be moved toward the right into the position shown in full lines in Fig. 3. In this position of the valve members 44, the pressure conduit 41 is in communication with the conduit 48 which then supplies fluid pressure to the cylinder above the piston 29, and the conduit 47 from the lower portion of the piston is in communication with an exhaust port 49A in the valve housing 43.

The application of vacuum to the mold units is controlled by the valve members 38, which are controlled by a stationary cam 51. This cam is arranged to coact with the plungers 52 which are reciprocally mounted in valve housings 53, or respective valves 38, one of which is diagrammatically shown in Fig. 4.

Each plunger 52 is provided with a piston or valve member 54 which, when held in the position shown in Fig. 4 by the cam 51, places its respective vacuum line or conduit 37 in communication with the flexible conduit 33 which leads to its respective mold unit 20. When a valve 38 is carried by the rotating table away from the high portion of the cam 51, a spring, such as that shown at 55 in Fig. 4, returns the valve member 54 to the position indicated by the dot and dash lines in that figure, whereupon the mold conduit 33 is brought into communication with an exhaust port 56 in the valve body, thereby relieving the vacuum in the mold.

In the mechanism shown in the drawings, the arrangement is such that the mold members are held separated to facilitate the charging of the molds, in the positions indicated at A, B and C. Normally, the machine may be charged by one attendant. However, should the mold units be each provided with three or four mold cavities instead of two, as shown, two or more attendants may be required to charge the machine.

In Fig. 5, I have shown a diagram of one complete cycle of operation of the apparatus. It will be noted that when the molds are in the position indicated at A, B and C, pressure is on the bottom of the piston to retain the molds open, and as a mold passes from the position C to the position D, the valve member 42 is actuated to reverse the fluid pressure and cause the mold to be closed, so that when the mold unit reaches the position D it is closed, whereupon the vacuum is applied for an interval of time sufficient to exhaust the air from the mold cavity.

The ball is held in the mold cavity through the positions D, E and F. When, however, it reaches the position E fluid pressure on the cylinder 28 is again reversed, causing the mold to open permitting the finished balls to be removed therefrom.

It will be seen that the mold members just described permit the use of a mold cavity somewhat larger in diameter than the diameter of the ball and in which the ball is pushed into contact with the mold cavities by the humps or protuberances in the bottom of the cavities, and this distortion of the shape of the ball, compressing it in two diametrically opposite regions, swells it outwardly in other regions, so that the seams of the cover are effectively pressed against the wall of the mold cavities.

This mechanical expanding of the ball due to the protuberances or humps in the mold cavities is accentuated by the additional internal pressure of the ball by the difference between the internal and external pressures of the ball when in the cavity, which, when the vacuum is applied to the cavity, serve to increase the relative internal pressure of the ball by the amount of the vacuum applied to the cavity. Thus, a comparatively high degree of pressure may be applied to the ball.

Figs. 11 to 15 inclusive illustrate a modified form of mold, which, however, employs the hump feature, so that the cover is applied to the ball by causing the ball to expand against the mold cavity due to the action of the humps and by the exhaustion of the air from the mold cavity, all as heretofore explained. This modified form of mold is additionally provided with resilient diaphragm-like members which are interposed between the ball and the mold cavity and which press equally against the surface of the ball. The mold is also provided with an elastic band which grips the ball about an equatorial zone midway between its contact with the humps and which mechanically compresses the ball in such zone, thereby tending to expand the ball farther and increasing the internal pressure of the ball against the mold cavity.

This modified form of mold member comprises lower and upper mold members 25A and 26A, each of which is provided with at least one mold cavity 31A. These cavities instead of being hemi-spherical, as in the case of the mold cavities 31 heretofore described, have a depth equal to about one-third of the diameter of the ball. Stretched across each mold cavity 31A, is a rubber-like diaphragm 56, which may be drawn into contact with the walls of the respective cavities 31A by a suitable vacuum applied through a conduit 57 having a control valve, not shown but similar to that shown in Fig. 4 and heretofore described, and which valve may be actuated by a stationary cam (not shown) in substantially the same manner as the valve 38 of Fig. 4. Each of the mold cavities 31A is also provided with a protuberance or hump 32A to mechanically compress and thereby expand the ball when the mold members are brought together, as heretofore described in connection with the mold members of Figs. 9 and 10.

The equatorial zone of the mold is formed by an expandable elastic ring 60. This ring is mounted in a groove 61 formed in a mold section 62 secured to the upper mold member 26A as, for instance, by bolts or screws 63. The elastic ring 60 is arranged to be retracted from the position shown in Fig. 11 to that shown in Fig. 12, by the application of a vacuum to the groove 61 between the ring and its carrier member 62. For this purpose a suitable conduit 64 interconnects passageways 6 in the mold member 62 with a valve mechanism, not shown but similar to that shown in Fig. 4 and heretofore described, and which is arranged to be actuated by a stationary cam similar to the cams 50 and 51.

When the mold members 25A and 26A are in the charging positions A, B and C, the mold members 25A and 26A are separated as heretofore described in connection with Figs. 1 and 2. The diaphragms 56 are seated against the walls of their respective mold cavities 31A by the application of vacuum through the conduits 57. The elastic ring 60 is retracted by the application of a vacuum to the groove 61 through the conduit 64.

Figures 11, 12, 13:
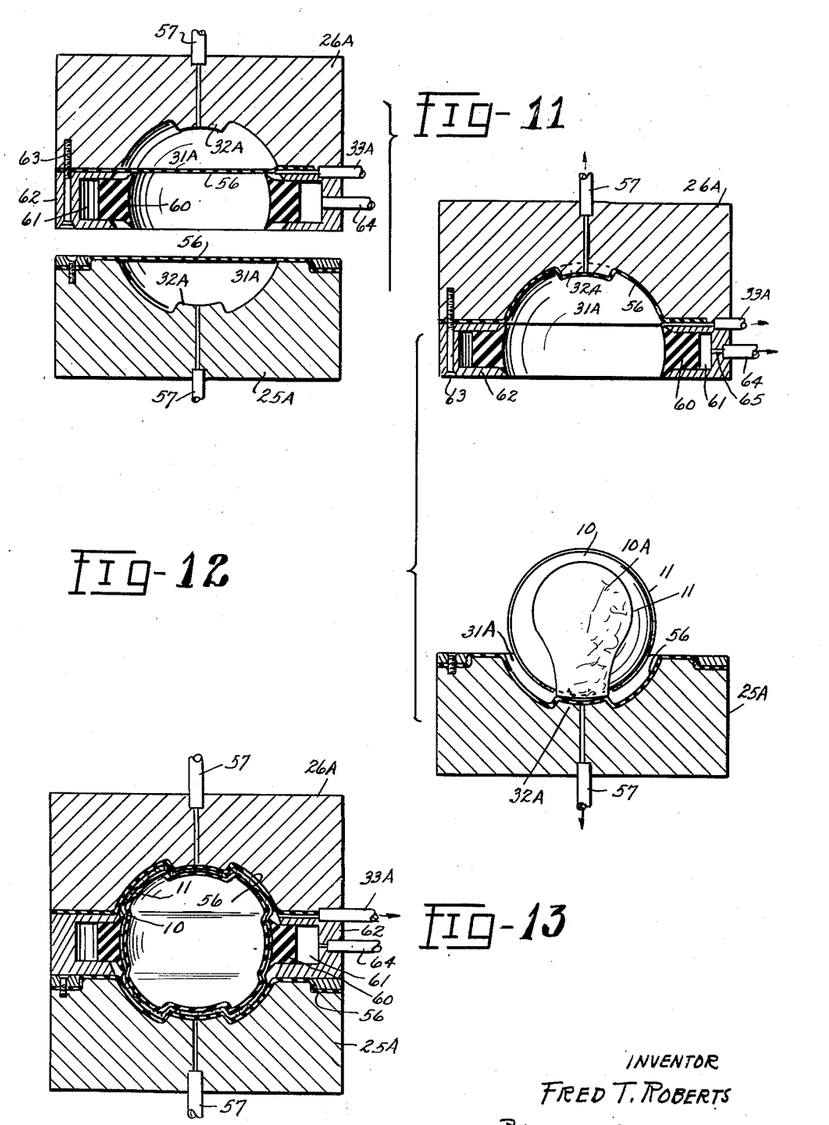
Figs. 11, 12, 13 and 14 are views, taken in a plane substantially the same as that indicated by the line 10—10 in Fig. 1, illustrating a modified form of mold in various operation positions.

The ball 10A having the two figure-eight covers "tacked" thereto, is placed in the lower mold cavity 31A in substantially the position indicated in Fig. 12. It will be seen that the longitudinal center of one of the figure-eight cover members is positioned on the hump 32A of the lower mold member.

The mold members 25A and 26A are then brought together, and the vacuum which retains the central elastic ring 60 in a retracted position, then is released, causing the ball to be depressed or squeezed inwardly in an equatorial zone midway between its contact with the humps. This causes the ball to swell into contact with the diaphragms 56 which lie against their respective mold cavities. The diaphragms 56 are then released causing them to press inwardly against the ball and the air is withdrawn from between the ball and the diaphragms by the vacuum pump which is connected thereto by a valve controlled conduit 33A which communicates with a passageway such as that indicated at 34A in Fig. 13.

Figures 14, 15, 16:
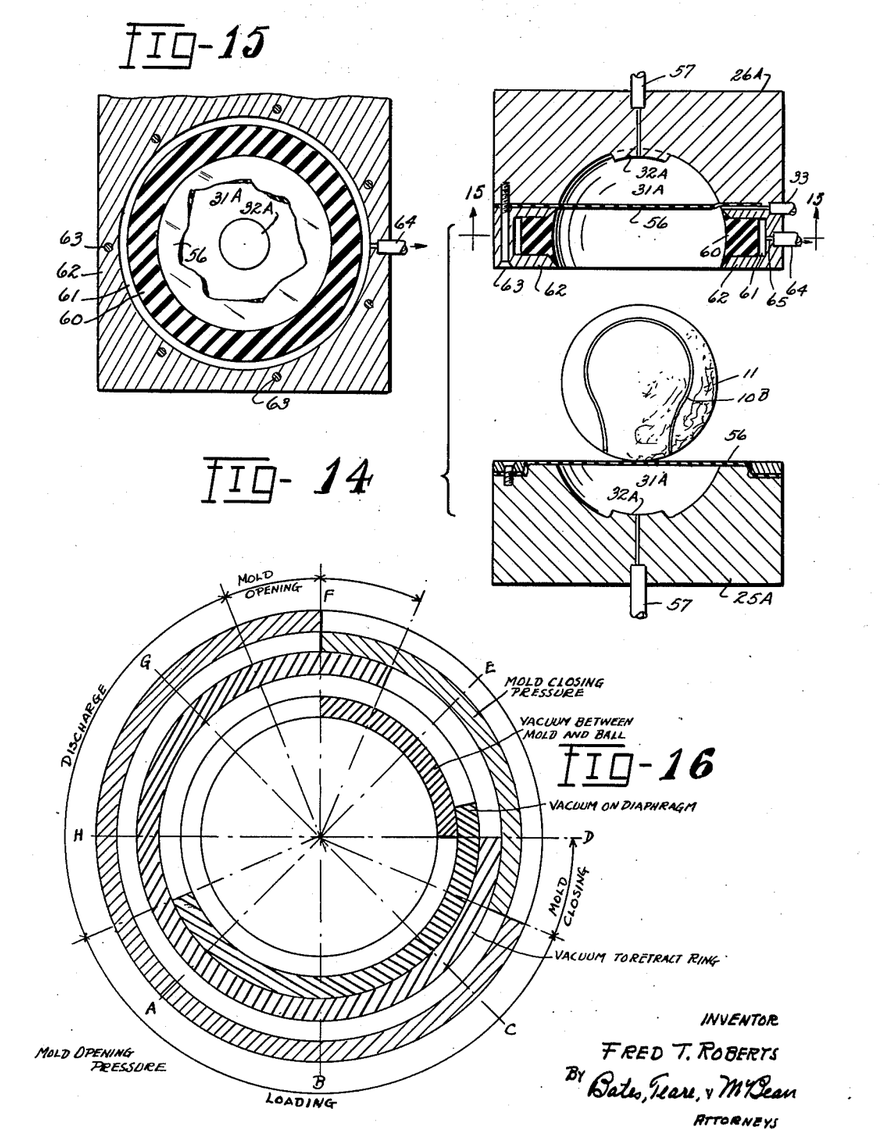
Fig. 15 is a transverse section as indicated by the lines 15—15 on Fig. 14.
Fig. 16 is a diagram illustrating one cycle of operation of the mechanism of Figs. 1 and 2 when the molds of Figs. 11 to 15 are used.

The sequence of operation of the forming mold, shown in Figs. 11 to 15, is diagrammatically illustrated in Fig. 16. Here it will be seen that pressure is applied to the bottom of the mold cylinder 28 to cause the molds to remain open as they pass through positions A, B and C. As the molds pass from position C to position D, the fluid pressure is reversed and applied to the upper end of the mold cylinder 28, thereby closing the mold. When the mold reaches the position D, the vacuum which through positions A, B, C and D retained the gripping ring 60 in a retracted position is released, permitting this ring to snap quickly into engagement with the ball, following which the vacuum on the diaphragm is released and a vacuum is applied to exhaust the air from between the diaphragms 56 and the ball. This condition is maintained until the ball passes through the position E and until it approaches the position F.

Shortly prior to the time the molds reach the position F, the elastic ring 60 is retracted, and when the mold reaches the position F the vacuum between the ball and the diaphragms 56 is released, and the fluid pressure to the cylinder 28 is reversed to open the mold, whereupon the lower diaphragm 56 resumes its normal position (Fig. 14) and causes the discharge of the ball from the mold.

In Figs. 17 to 21 inclusive, there is illustrated a further modification of the mold unit. This form of mold is substantially the same as that described in my prior application, heretofore mentioned. This mold is arranged so that when the ball is positioned within the closed mold members, the ball will expand due to the exhaustion of air from between a diaphragm fixed between the mold member and the mold cavity, thereby causing the ball to swell into contact with the diaphragm. Thereafter the fluid pressure is introduced between the mold cavities and the diaphragms to contract the ball and firmly affix the cover thereto.

The molds as shown in Figs. 17 to 21 inclusive comprise mold members 25B and 26B each having a hemi-spherical mold cavity 31B, across which is stretched a resilient membrane such as a rubber diaphragm 56B. This diaphragm is arranged to be drawn into contact with the mold cavity by the application of a vacuum to the mold cavity, for instance through a conduit 66 controlled by a valve mechanism similar to that shown in Fig. 4 and which is actuated by a cam unit of Figs. 17 to 21 similar to the cams 50 and 51.

Figure 17:
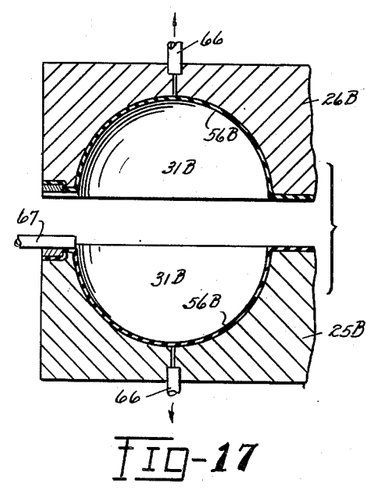
Figs. 17 to 21 inclusive are sectional views taken in substantially the plane indicated by the lines 9—9 of Fig. 1 but illustrating a further modified form of mold member in successive operating positions.
Figure 18:
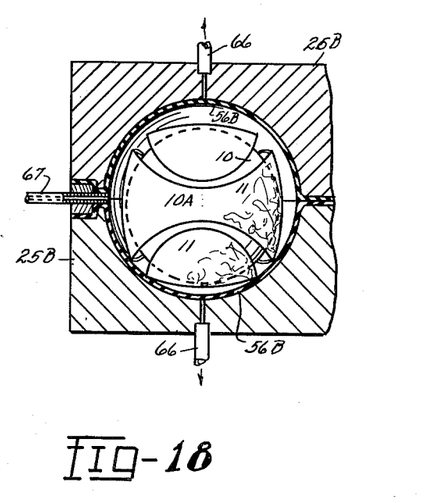
Figure 19:
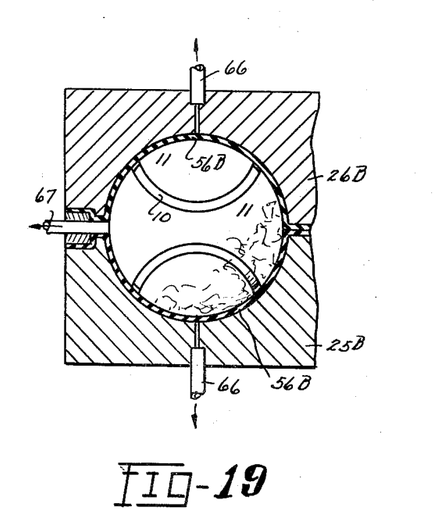
Figure 20:
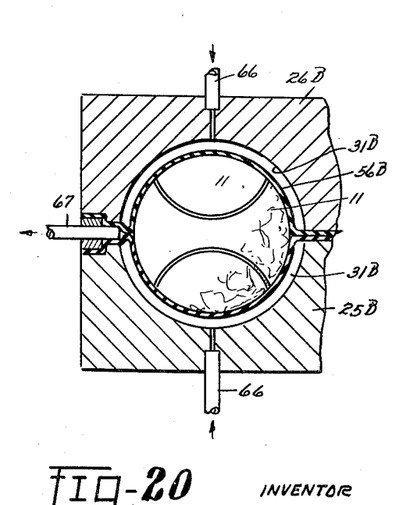

When the mold unit of Figs. 17 to 21 is used on the table 16, the mold members 26B and 25B will be held separated a distance to permit the ball to be placed in the lower mold cavity and the diaphragms 56A will be drawn into contact with their respective mold cavities by the application of the vacuum thereto as indicated in Fig. 17. The ball 10A is then positioned in the lower mold cavity and the mold members brought together as illustrated in Fig. 18.

The air between the ball and the diaphragm 56B is then exhausted through the conduit 67. Following this exhaustion of the air, the diaphragms 56B are released, thus pressing the cover against the ball. Fluid pressure then is applied through the conduit 66 to the spaces between the diaphragms 56B and the walls of the mold cavities 31B thus further increasing the pressure of the diaphragms against the cover of the ball and securely affixing the cover in position.

Figures 22, 23:
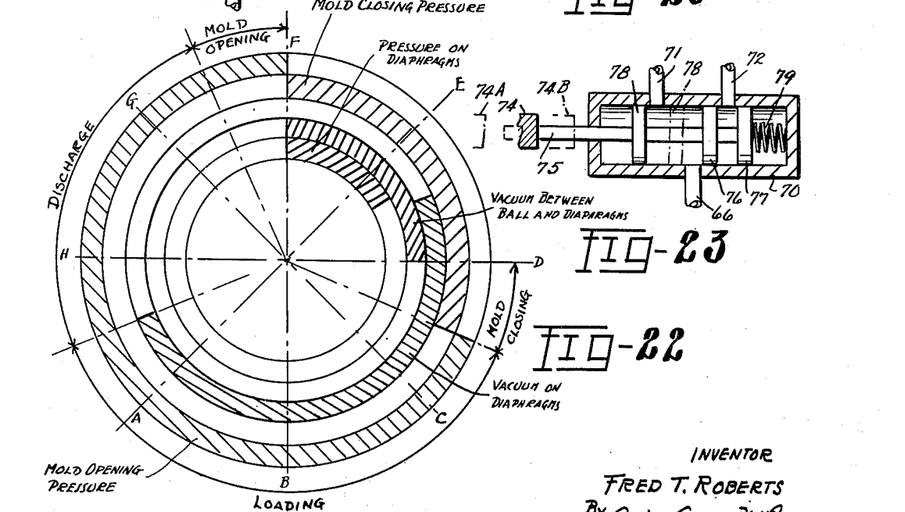
Fig. 22 is a diagram illustrating a cycle of operation of the machine of Figs. 1 and 2 when the mold members of Figs. 17 to 21 are used.
Fig. 23 is a diagrammatic illustration of a valve mechanism which is used in connection with the form of mold members illustrated in Figs. 17 to 21 inclusive.

The flow of fluid into the mold cavities between the diaphragm and the mold cavity is controlled by a valve 70, such as that diagrammatically shown in Fig. 23. As there shown, the valve may comprise a body having a port communicating with the conduit 66 and ports 71 and 72 communicating with the vacuum pump 23 and pressure pump 24 respectively. The valve 70 is arranged to be controlled by a cam, a portion of which is indicated at 74 in Fig. 23 and which is similar to the cams 50 and 51 heretofore described.

A spring 79, mounted within the valve housing, normally urges a valve rod 75 toward the left in that Fig. 23 so that a pair of valve members 76 and 77 cut the communication between the mold conduit 66 and the vacuum conduit 71 and the pressure conduit 72. When, however, the diaphragms 56B are to be retracted into contact with their respective mold cavities 31B, the cam 74 strikes the plunger 75, moving the valve members 76 and 77 into position shown in Fig. 23, so that communication is established between the mold conduit 66 and the vacuum conduit 71.

Further rotation of the table about its axis brings the cam and valve into a position relative to the valve, as indicated by the dot and dash lines 74B. This moves the valve members further to the right (Fig. 23) so that the valve member 76 comes to the position occupied by the valve member 77 in that figure and a valve member 78 moves from its full line position to the dotted line position. This breaks the communication between the vacuum conduit 71 and the mold conduit 66 and establishes a communication between the pressure conduit 72 and the mold conduit 66.

Further rotation of the table 16, then causes the cam to assume the dot and dash line position 74B relative to the valve, whereupon a spring 79 moves the valve members to their original position, severing communication between either the vacuum lines 71 or the pressure line 72 and the mold conduit 66. A suitable release valve, not shown, but of any well-known type, may also be operated by the cam to insure the release of any pressure either positive or negative between the mold cavities 31B and the diaphragms 56B when the molds are in their charging and discharging positions.

The operation of the molds of Figs. 17 to 21 for one complete revolution of the table 21, or one cycle of operation of the mechanism, is diagrammatically illustrated in Fig. 22. In this figure it will be noted that when the molds are in the positions A, B and C, pressure is applied from the bottom of the piston 29 to separate the mold members 25A and 26A, and a vacuum is applied to retract the diaphragms 56B into contact with the walls of the cavities 31B. As the molds move from the position C toward the position D, the mold members are brought together by reversing the direction of flow of fluid to the cylinder 28.

When the molds reach the position D, the air is exhausted from between the ball 10A and the diaphragms 56B, following which, and as the molds move from the position D to the position E, the vacuum in the space between the diaphragms 56B and the walls of the mold cavities is released, and fluid pressure is applied to such space to cause the diaphragm to contact the ball. This pressure remains on the diaphragms as the molds pass from stations E to F and is released at station F and simultaneously the vacuum between the ball and the diaphragm 56A is released, and the fluid pressure on the mold cylinder 28 is again reversed, thus causing the mold to open to discharge the completed balls as the mold passes through stations G and H. As the molds pass from station H to station A, the vacuum is again applied to retract the diaphragms 55B into contact with their respective mold cavities, thus completing the cycle of operations.

The discharge of the ball from the mold units 20 may complete the ball, or may complete it except for an eight shaped groove 10B (Fig. 24) extending between the adjacent edges of the two cover members 11. Under certain circumstances this is an advantage as this narrow groove provides a channel to receive excess cement which may accumulate on the edges of the cover member.

Figures 21, 24, 25:
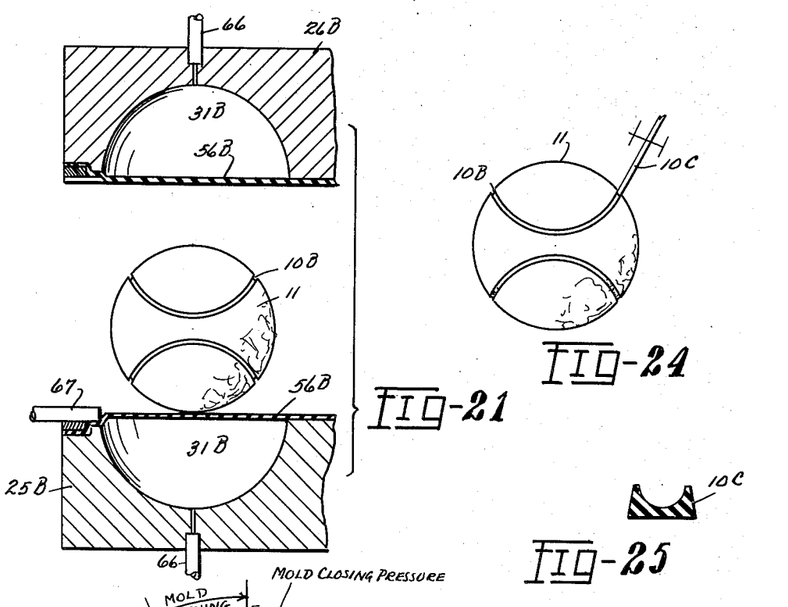
Fig. 24 is a view of a ball and illustrates the final step of the improved method of covering the ball when a seam like separation of the cover members is desired.
Fig. 25 is a sectional view of the seaming material, the plane of the section being indicated by the lines 25—25 on Fig. 24.

If no groove between the cover members is desired the covers are of such size as to abut snugly when affixed to the ball. However, when a groove 10B is to be left, the covers may be somewhat smaller. This groove may be filled by the application of a rubber strip 10C which may be firmly pressed into place and the cement permitted to dry.

My method and apparatus, however, are equally applicable for the covers of balls where no groove is desired between the edges of the cover and the finished ball. In the ordinary manufacture of tennis balls, cement is employed on the inner face of the cover or the outer face of the ball or both and this cement requires vulcanization to set it, and such vulcanization results in shrinking the cover. Accordingly, it has been customary in the past to cut the cover members with fullness so that as they are applied the edges contact with each other or are puckered or slightly overlap and this adds to the difficulty of manual application, as air is particularly likely to be entrapped in spots beneath the cover and to be sealed in by the cement at the edges of the cover.

In my method of exhausting the air between the cover and ball, or in the modifications shown of enlarging the ball before the cover is applied, either by pneumatic expansion, or by the employment of the hump in the mold, I can use covers having cover members, the combined area of which is at least as great or greater than the surface area of the ball, without danger of entrapping air beneath the covers.

When I apply an extra large cover member to an enlarged region of the ball, the cement holds the cover in place on the wall but as the released wall shrinks the cover shrinks with it throughout its area. Then when the vulcanization takes place, and the ball is assuming its final form, this shrinkage becomes permanent and a continuous, smooth, closely joined cover results in the final product.

It will be understood, therefore, that this method and apparatus may be employed whether the covers are cut with a fullness and caused to contact at their edges or cut so as to leave a groove between such edges.

This invention contemplates the use of means such as the hump 32 or 32A of Figs. 9 to 11 inclusive, or the resilient band or ring of Figs. 11 to 15 inclusive to increase the internal pressure of the ball while it is in a substantially spherical mold cavity. It is contemplated that the hump or band may each be used separately and independent of other means, or they may be used in conjunction with each other and with or without mold linings such as the impervious sheets 56 and 56B of Figs. 11 and 21 respectively as well as with or without the exhaustion of the air from the mold cavity.

I have referred to using cement of migratory character for uniting the cover to the ball. I find it satisfactory to use on the ball a cement containing butyl (which is a very strong accelerator) and for using on the cover a cement without butyl. There is sufficient butyl in the cement on the ball so that some of it passes to the cover as the cover comes in contact with the surface of the ball. I prefer to use enough cement on the ball so that some of it squeezes out beyond the edge portion of the covers as the ball is expanded by pressure over the entire surface, and this allows the covers to shift a little in the event that the cover accidentally adheres to the ball beyond the line of pressure made by the wheels.

I claim:

1. The method of securing covers on an inflated ball comprising securing a part of the surface of the cover to the ball, seating the ball in an enclosing mold having a cavity the shape of the exterior of the finished ball, and indenting the wall of the ball to cause the ball to expand in other regions to force the cover against the wall of the cavity.

2. The method of securing covers on a ball comprising securing a part of the surface of the cover to the ball, seating the ball in an enclosing mold having a cavity of a shape corresponding to the exterior of the finished ball, and indenting the ball in diametrically opposed regions to cause the ball to expand in other regions and bind the cover between the wall of the mold and the ball to thereby firmly affix the cover to the ball.

3. The method of securing covers on an inflated ball comprising applying a coating of cement to the ball, securing limited areas of the covers to the ball, placing the ball in a mold cavity having yielding linings, exhausting the air from between the linings and the cavity and from between the ball and the linings to cause the ball to expand into contact with the linings as a result of the internal pressure in the ball, and simultaneously deforming the wall of the ball to increase the internal pressure of the expanded ball.

4. The method of securing covers on an inflated ball, comprising applying a coat of cement to the ball, securing a comparatively small portion of each cover to the ball, placing the ball in a substantially spherical mold cavity, withdrawing the air from between the mold cavity and the ball to permit the inflating pressure to expand the ball into contact with the wall of the mold cavity, indenting the wall of the ball in two diametrically opposed regions of limited areas to increase the internal pressure of the ball, and further indenting the ball in a narrow equatorial zone substantially midway between said first named indented areas.

5. The method of joining covers to an inflated ball, comprising applying a coat of cement to one of the coacting surfaces to be joined, securing a comparatively limited region of the covers to the ball, placing the ball in a substantially spherical mold cavity, indenting the ball in two substantially diametrically opposed regions of limited areas to cause other areas of the ball to expand and clamp the covers between the wall of the ball and the wall of the cavity, and further increasing the internal pressure by indenting the ball in an equatorial zone midway between the two previously indented areas.

6. The method of joining covers to an inflated ball comprising applying a coat of cement to one of the coacting surfaces to be joined, securing a comparatively limited area of the covers to the ball, placing the ball in a substantially spherical mold cavity, indenting the ball in an equatorial zone extending completely around the ball to increase the internal pressure in the ball and thereby cause other areas of the ball to expand into contact with the mold.

7. The method of securing a pair of figure eight shaped covers to a ball, comprising applying a coat of cement to the surfaces to be secured together, securing the covers to the ball in comparatively limited areas, placing the ball in a substantially spherical mold cavity, exhausting the air from the mold cavity, and simultaneously indenting the ball at two diametrically opposed regions of limited areas, each region being in substantially the longitudinal center of respective cover members.

8. The method of affixing a pair of figure eight cover members to an inflated ball, applying a coat of cement to the surfaces to be affixed, joining each cover to the ball in a limited area, placing the ball in a substantially spherical mold cavity, and indenting the ball in an equatorial zone extending around the ball substantially midway between the longitudinal centers of the cover members, to expand the ball by reason of the inflating pressure and cause other portions of the ball to engage the wall of the mold cavity.

9. The method of affixing a pair of figure eight cover members to an inflated ball, applying a coat of cement to the surfaces to be affixed, joining each of the covers to the ball in a comparatively small area, placing the ball in a substantially spherical mold cavity, indenting the ball at substantially diametrically opposed areas of comparatively small area at the longitudinal center of the respective covers to cause the ball to expand into contact with other areas of the mold cavity as a result of the inflating pressure, and subsequently indenting the ball in an equatorial zone extending entirely around the ball substantially midway between the previously indented areas to increase the inflating pressure.

10. The method of affixing a pair of figure eight covers to an inflated ball, comprising applying a coat of cement to the surfaces to be affixed together, preliminarily securing each cover to the ball in a narrow equatorial zone, placing the ball in a substantially spherical mold cavity, exhausting the air from the cavity to cause the ball to expand the ball into contact with the wall of the cavity as a result of the inflating pressure, and increasing the inflating pressure by compressing the ball in a narrow equatorial zone encircling the ball in a plane extending at right angles to the preliminary secured zones.

11. The method of affixing a pair of figure eight shaped covers to an inflated ball, comprising applying a coat of cement to the surfaces to be joined, securing each cover to the ball in a narrow equatorial zone extending lengthwise of the respective cover, placing the ball in a substantially spherical mold cavity, exhausting the air from the cavity to expand the ball into contact with the wall of the cavity as a result of the inflating pressure, indenting the ball at spaced points in the regions of the equatorial zones of respective covers to increase the inflating pressure of the ball.

12. The method of affixing a pair of figure eight covers to an inflated ball, comprising applying a coat of cement to the surfaces to be affixed, affixing each cover to the ball in a narrow equatorial zone extending lengthwise of the respective cover members, placing the ball between a pair of mold members having cavities therein which when brought together form one substantially spherical cavity, bringing the mold members together, indenting the ball at a point on the equatorial zone of each cover member and substantially midway between the ends of such cover member to increase the inflating pressure of the ball, exhausting the air from the closed mold cavity to cause the ball to expand into contact with the walls of the cavities as a result of the inflating pressure, and subsequently compressing the ball in an equatorial zone extending around the ball in a plane substantially at right angles to each of the first named equatorial zones.

13. An apparatus for securing covers to balls comprising a pair of coacting mold members each having a cavity therein, said members being arranged to be brought together with their cavities forming a substantially spherical cavity for the reception of a ball, the wall of at least one of said cavities having a hump having a concave surface extending into the cavity to indent the ball when the mold members are brought together.

14. An apparatus for securing covers to balls, comprising a pair of coacting mold members each having a substantially hemispherical cavity, a hump formed in the bottom of each cavity, said humps being positioned to diametrically oppose each other when the mold members are brought together, and means to exhaust air from the cavities including suction passageways extending through respective humps to the interior of the mold.

15. An apparatus for securing covers to balls comprising a split mold having a substantially spherical cavity, and means to compress a ball positioned in such cavity in an equatorial region to thereby expand other portions of the ball.

16. An apparatus for securing covers to balls comprising a split mold having a substantially spherical cavity, means carried by said mold to compress a ball in an equatorial zone extending substantially around the ball to thereby expand other portions of the ball into contact with the wall of the cavity, and means to retract said first named means.

17. An apparatus for securing covers to balls comprising a split mold having a substantially spherical cavity, a resilient ring encircling the cavity in an equatorial zone, the inner wall of the ring forming a portion of the wall of the cavity when the ring is expanded, and means to expand said ring.

18. An apparatus for securing covers to balls comprising a split mold having a substantially spherical cavity, an equatorial groove in said mold, an elastic ring in said groove, the internal surface of said ring normally projecting into the cavity, means to exhaust the air from said groove to draw the ring into the groove whereby the inner wall of the ring forms a continuation of the wall of the cavity, and means to thereafter exhaust the air from the cavity.

19. An apparatus for covering balls comprising a split mold having a substantially spherical cavity therein to receive an inflated ball, means carried by said mold to indent a relatively small area of the ball, and means carried by said mold to compress the ball in an equatorial zone spaced from said area to thereby cause the ball to swell into contact with the mold cavity.

20. An apparatus for covering balls comprising a split mold having a substantially spherical cavity to receive an inflated ball, said mold having a pair of substantially diametrically opposed humps of comparatively small surface area projecting into said mold to indent the ball and cause the internal pressure in the ball to force other portions of the ball against the wall of the mold cavity, a resilient ring carried by said mold and encircling the cavity in an equatorial zone midway between said humps, means to retract said ring, and where said ring is provided with an inner wall which when the ring is retracted substantially forms a portion of the mold cavity and which when the ring is in a non-retracted position projects into said cavity.

21. An apparatus for covering balls comprising a pair of mold members each having a cavity less than a hemisphere, a third mold member having an annular cavity disposed between the first named members, said members being movable to bring their cavities together to form a substantially spherical mold cavity, a rectractable resilient ring carried by the third member and having an inner wall adapted to form a portion of the spherical cavity when the ring is retracted, vacuum means to retract said ring, and means to exhaust the air from the spherical cavity.

22. An apparatus according to claim 21 in which each of the first named pair of mold members has a yielding impervious sheet across the cavity therein, and wherein there is means for exhausting the air from such cavities to seat the respective sheets therein.

23. An apparatus according to claim 21, in which each of said first named pair of mold cavities is provided with a polar hump of comparatively small area and which extends into the cavity to indent a ball.

24. An apparatus for covering tennis balls or the like, comprising a rotatable table, a plurality of molds split on said table and having a substantially spherical cavity and spaced equidistant from each other, means responsive to the rotation of said table to open and close said molds, compression means carried by each mold to compress an equatorial zone of a ball positioned therein, and means controlled by the table to render said compression means active.

25. An apparatus for covering tennis balls and the like comprising a rotatable table, a plurality of mold units carried by said table, each unit comprising a split mold having a substantially spherical cavity, an equatorial groove in said mold, an elastic ring in said groove, the internal surface of said ring normally projecting into the cavity, means controlled by the rotation of said table to exhaust the air from said grooves to draw the rings into their respective grooves whereby the inner wall of the rings form a continuation of the wall of the respective cavities and means controlled by the rotation of said table to thereafter exhaust the air from the respective cavities.

26. An apparatus for covering tennis balls or the like comprising, a table mounted for rotation about a vertical axis, a plurality of mold units mounted on said table and spaced equidistant from each other and from the axis of rotation, each unit comprising a pair of mold members each having a cavity less than a hemisphere, a third mold member having an annular cavity disposed between the first named members, said members being relatively movable to bring their cavities together to form a substantially spherical mold cavity, means to open and close said members, retractable resilient ring carried by the third member and having an inner wall adapted to form a portion of the spherical cavity when in a retracted position, vacuum means controlled by the rotation of said table to retract said ring, and means controlled by the rotation of said table to exhaust the air from the spherical cavity.

27. An apparatus according to claim 26 in which each of the first named pair of mold members of each unit has a yielding impervious sheet across the cavity therein, and wherein there is means controlled by the rotation of said table for exhausting the air from such cavities to seat the sheets therein prior to the closing of the mold members.

28. The method of securing covers on an inflated ball comprising securing a part of the surface of the cover to the ball, seating the ball in an enclosing mold having a cavity substantially the shape of the exterior of the finished ball, exhausting the air from the space between the ball and the wall of the cavity to cause the ball to expand into contact with the wall of the cavity as a result of the inflating pressure within the ball, and indenting the wall of the ball to cause the ball to expand in other regions to force the cover against the wall of the cavity.

29. The method of securing covers on an inflated ball comprising securing a comparatively small part of the surface of the cover to the ball, seating the ball in a mold cavity, exhausting the air from the space between the ball and the wall of the cavity to cause the ball to expand into contact with the wall of the cavity as a result of internal pressure in the ball, and simultaneously indenting the ball in diametrically opposed regions of limited area to increase the internal pressure of the ball.

30. The method of securing covers on an inflated ball comprising securing a part of the surface of the cover to the ball, seating the ball in a mold cavity, exhausting the air from the cavity to cause the ball to expand as a result of the inflating pressure and force the cover against the wall of the cavity, and indenting the ball in a narrow equatorial zone while the air is exhausted from the cavity to increase the inflating pressure of the ball.

FRED THOMAS ROBERTS.

REFERENCES CITED

The following references are of record in the file of this patent:

UNITED STATES PATENTS

| Number | Name | Date |
|---|---|---|
| 1,387,805 | Roberts | Aug. 16, 1921 |
| 1,400,146 | Eggers et al. | Dec. 13, 1921 |
| 2,117,400 | Cobb | May 17, 1938 |
| 2,224,363 | Voit et al. | Dec. 10, 1940 |
| 2,300,096 | Bowers | Oct. 27, 1942 |
| 2,429,121 | Crowley | Oct. 14, 1947 |
| 2,429,122 | Crowley | Oct. 14, 1947 |